(12) United States Patent
Marom et al.

(45) Date of Patent: May 29, 2018
(10) Patent No.: US 9,985,468 B2

(54) SECURED ON-DEMAND ENERGY SYSTEMS

(71) Applicant: Nova Lumos Ltd., Beit-YeHoshua (IL)

(72) Inventors: Nir Marom, Tzur-Moshe (IL); David Vortman, Tzur-Moshe (IL); Nir Nitzani, Kfar Saba (IL); Rafi Boneh, Tel Aviv (IL); Yoav Medan, Haifa (IL)

(73) Assignee: Nova Lumos Ltd., Netanya (IL)

( * ) Notice: Subject to any disclaimer, the term of this patent is extended or adjusted under 35 U.S.C. 154(b) by 174 days.

(21) Appl. No.: 14/710,954

(22) Filed: May 13, 2015

(65) Prior Publication Data

US 2015/0241898 A1    Aug. 27, 2015

Related U.S. Application Data

(63) Continuation-in-part of application No. 14/593,298, filed on Jan. 9, 2015, which is a continuation of application No. PCT/IL2013/050587, filed on Jul. 10, 2013.

(60) Provisional application No. 61/992,936, filed on May 14, 2014, provisional application No. 61/670,619, filed on Jul. 12, 2012.

(51) Int. Cl.
| | |
|---|---|
| *G05D 3/12* | (2006.01) |
| *G05D 5/00* | (2006.01) |
| *G05D 9/00* | (2006.01) |
| *H02J 7/35* | (2006.01) |
| *H02J 7/00* | (2006.01) |

(Continued)

(52) U.S. Cl.
CPC ............... *H02J 7/35* (2013.01); *G06Q 50/06* (2013.01); *H02J 1/00* (2013.01); *H02J 7/007* (2013.01); *Y10T 307/625* (2015.04)

(58) Field of Classification Search
CPC .... H02J 7/35; H02J 7/007; H02J 1/00; G06Q 50/06; Y10T 307/625
USPC .................................................. 700/286–296
See application file for complete search history.

(56) References Cited

U.S. PATENT DOCUMENTS

| 6,191,501 B1 | 2/2001 | Bos |
| 2003/0034757 A1 | 2/2003 | Woodnorth |

(Continued)

FOREIGN PATENT DOCUMENTS

| JP | 2005056049 A | * 3/2005 |
| KR | 20080018630 A | 2/2008 |

OTHER PUBLICATIONS

Japanese Application 2005056039 A, Authentication System of Portable Information Equipment and Charging System to Portable Information Equipment, Sony Corporation, Mar. 3, 2005.

(Continued)

*Primary Examiner* — Ziaul Karim
(74) *Attorney, Agent, or Firm* — M&B IP Analysts, LLC

(57) ABSTRACT

A system for providing electrical energy to an energy consumer includes an environmental energy source; an energy storage unit being electrically connected to the environmental energy source and configured to operate with the environmental energy source; and a control unit connected to the environmental energy source and to the energy storage unit, the control unit further comprising an authentication unit configured to periodically authenticate operation of the energy storage unit with the environmental energy source such that, upon authentication by the authentication unit, the control unit enables energy to flow from the environmental energy source to the energy storage unit.

15 Claims, 2 Drawing Sheets

(51) Int. Cl.
*H02J 1/00* (2006.01)
*G06Q 50/06* (2012.01)

(56) References Cited

U.S. PATENT DOCUMENTS

| | | | |
|---|---|---|---|
| 2004/0119685 | A1 | 6/2004 | Harries et al. |
| 2005/0222784 | A1* | 10/2005 | Tuff .................. G06Q 50/06 702/61 |
| 2006/0276938 | A1 | 12/2006 | Miller |
| 2007/0043478 | A1* | 2/2007 | Ehlers ................ F24F 11/0012 700/276 |
| 2008/0315829 | A1 | 12/2008 | Jones et al. |
| 2010/0181957 | A1* | 7/2010 | Goeltner ................ B60L 8/003 320/101 |
| 2010/0223180 | A1 | 9/2010 | Kremen |
| 2010/0241375 | A1 | 9/2010 | Kumar et al. |
| 2010/0262312 | A1* | 10/2010 | Kubota .............. H01M 10/425 700/295 |
| 2011/0114079 | A1 | 5/2011 | Heckendorn |
| 2011/0234149 | A1 | 9/2011 | Hoshi et al. |
| 2011/0258093 | A1 | 10/2011 | Antoci |
| 2012/0035871 | A1 | 2/2012 | Cofta et al. |
| 2012/0143383 | A1 | 6/2012 | Cooperrider et al. |
| 2012/0197449 | A1 | 8/2012 | Sanders |
| 2012/0229709 | A1 | 9/2012 | Heald et al. |
| 2012/0259735 | A1 | 10/2012 | Taylor et al. |
| 2012/0293000 | A1 | 11/2012 | Fan et al. |
| 2013/0169226 | A1 | 7/2013 | Read |
| 2013/0253973 | A1 | 9/2013 | Ishibashi |
| 2014/0183957 | A1 | 7/2014 | Duchesneau |

OTHER PUBLICATIONS

Patent Cooperation Treaty International Search Report and the Written Opinion for PCT/IL2013/050587, ISA/US, Alexandria, VA, dated Jan. 10, 2014.

The International Search Report and the Written Opinion of the International Searching Authority for PCT/US15/30505, ISA/RU, Moscow, Russia, dated Aug. 20, 2015.

First Office Action dated Jun. 28, 2017 for Chinese Patent Application No. 201380043354.8 from State Intellectual Property Office of the P.R.C., China.

* cited by examiner

_US 9,985,468 B2_

SECURED ON-DEMAND ENERGY SYSTEMS

CROSS-REFERENCE TO RELATED APPLICATIONS

This application claims the benefit of U.S. Provisional Patent Application No. 61/992,936 filed on May 14, 2014. This application is also a continuation in part of U.S. patent application Ser. No. 14/593,298 filed on Jan. 9, 2015, which is a continuation application of PCT Application No. PCT/IL2013/050587 filed on Jul. 10, 2013, which claims the benefit of Israeli Patent Application No. 61/670,619 filed on Jul. 12, 2012. All of the applications referenced above are herein incorporated by reference.

TECHNICAL FIELD

The present disclosure relates to a system which can be used to provide off-grid renewable electrical energy on demand and, and more particularly, to a system that enables a user to purchase off-grid renewable electrical energy based on use.

BACKGROUND

Renewable energy, and in particular energy generated by solar photovoltaic panels or wind/water turbines, can be particularly suitable for developing countries since transmission and distribution of energy generated from fossil fuels can be difficult and expensive in such countries.

Advances in technology and reduction in manufacturing costs make solar energy an attractive alternative to energy generated from fossil fuels. During the period between 2008-2011, the price of photovoltaic modules per megawatt (MW) has fallen by over 60%.

Approximately 1.5 billion people around the world do not have access to grid electricity. An additional 1 billion are connected to unreliable grids. Even though these people are typically poor, they pay far more for lighting than people in western countries because they use inefficient energy sources (such as kerosene) which are far costlier than grid electricity or environmentally-produced energy.

Renewable energy projects in many developing countries have demonstrated that renewable energy can directly contribute to economic development and poverty alleviation by providing the energy needed for creating businesses and employment as well as providing energy for cooking, space heating and cooling, lighting, etc. In addition, renewable energy can also contribute to education by providing electricity to schools as well as to homes for home based education, in addition to providing energy for mobile devices and wireless communications.

In a typical environmental energy system utilizing solar or wind power, excess energy is stored in an energy storage device such as a battery. This is accomplished via an energy storage regulator (also called a charge controller), also common in many consumer electronic devices such as laptops, emergency lights, mobile phones, etc.

Stored battery power is typically available to electronic devices without any access restrictions or need for device-battery authentication. However, in cases of stored environmentally-produced energy, lack of access restrictions and authentication can lead to theft of electrical energy and depletion of stored energy, as well as theft of expensive system components (e.g., batteries).

It would therefore be advantageous to provide a system that would overcome the deficiencies noted above which can provide electrical energy to a user from an energy storage device which is authenticated for use with an electrically-connected environmental energy source. It would be further advantageous to provide a system which further controls the amount and rate of electrical energy supplied from the energy storage device based on a plan purchased by the user.

SUMMARY

A summary of several example aspects of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all aspects. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments disclosed herein include a system for providing electrical energy to an energy consumer. The system comprises an environmental energy source; an energy storage unit being electrically connected to the environmental energy source and configured to operate with the environmental energy source; and a control unit connected to the environmental energy source and to the energy storage unit, the control unit further comprising an authentication unit configured to periodically authenticate operation of the energy storage unit with the environmental energy source such that, upon authentication by the authentication unit, the control unit enables energy to flow from the environmental energy source to the energy storage unit.

Certain embodiments disclosed herein also include a method for providing electrical energy to an energy consumer. The method comprises initializing an environmental energy source to operate with an energy storage unit; initializing the energy storage unit to operate with the environmental energy source; electrically connecting the environmental energy source to the energy storage unit; and performing an authentication of the electrical connection between the energy storage unit and the environmental energy source.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
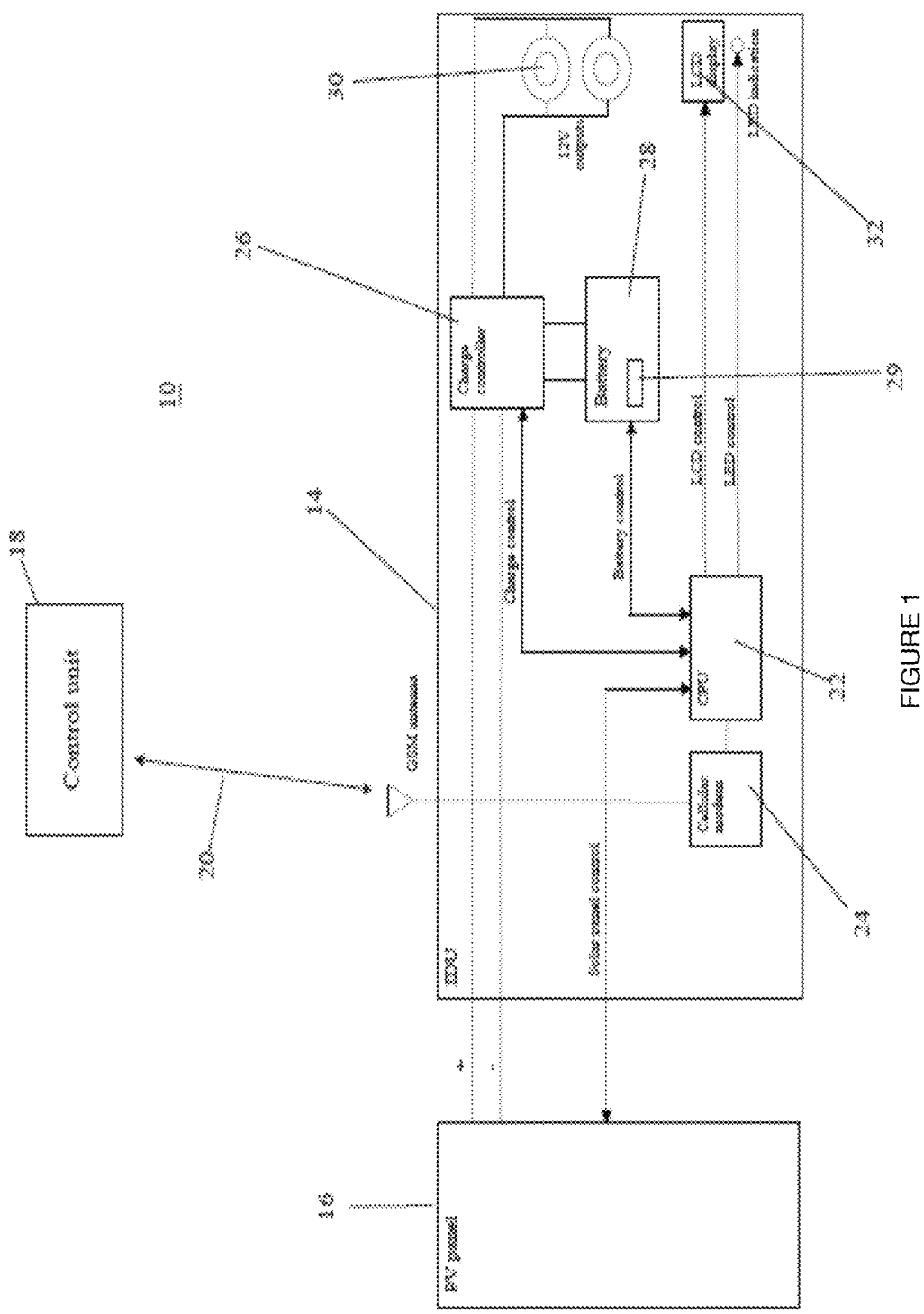
FIG. 1 is a block diagram of a secured on-demand energy system.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. The principles of the disclosed embodiments may be better understood with reference to the drawings and accompanying descriptions. In the drawings, like numerals refer to like parts through several views.

Before explaining at least one embodiment of the disclosure in detail, it is to be understood that the disclosure is not limited in its application to the details of construction and the arrangement of the components set forth in the following description or illustrated in the drawings. The disclosure is capable of other embodiments or of being practiced or carried out in various ways. Also, it is to be understood that the phraseology and terminology employed herein is for the purpose of description and should not be regarded as limiting.

Although renewable energy systems are a promising source of energy for developing countries, deployment of renewable energy systems, such as photovoltaic panels in a rural area, can be costly and beyond the financial capabilities of individuals and is limited by the energy-producing capabilities of environmental energy sources.

What is devised is a secure renewable energy system that is specifically suitable for providing pay-per-use electrical energy twenty four hours a day. This system provides a continuous source of energy to individuals that do not have access to grid energy while providing the system owner with the security that the equipment (e.g., solar cells and/or control unit) and/or electricity are not stolen, misused, or hacked.

Thus, according to one exemplary and non-limiting aspect of the present disclosure, there is provided a system for providing renewable electrical energy to a subject. As used herein, the term "renewable electrical energy" refers to energy produced by renewable resources, specifically environmental energy sources such as the sun (solar energy converted to heat or electricity), water (hydroelectric or wave generators), wind, and the earth (geothermal energy). As is further described herein, the electrical energy is provided from an electrical energy storage unit electrically-connected to, and authenticated for use with, an environmental energy source. The "electrical energy" can be provided to the user based on quantity (total amount of electrical energy provided) and/or a rate (power) limit of a pre-purchased plan, and/or more.

FIG. 1 is a block diagram of a secured on-demand energy system 10. The system 10 includes an In Door Unit 14 (also referred to herein as IDU 14, the function and composition of which are detailed hereinbelow) and an environmental energy source 16 (also referred to herein as PV panel 16). IDU 14 and PV panel 16 are installed locally (on-site components of system 10) and can be integrated into a single housing, or a single IDU 14 can be wired to several locally dispersed PV panels 16 (solar panel farm). System 10 further includes a control unit 18 which communicates with the IDU 14 via a communication network (e.g. cellular network) 20. Control unit 18 can communicate with numerous IDUs 14 (e.g., with hundreds to millions of IDUs 14). The IDU 14 is typically placed in-doors, while the PV panel 16 outdoors, typically on a roof or any other area not obscured from the maximum amount of solar energy reaching thereon, and the control unit 18, having typically cellular connection with the IDU 14, may be at varying distances from each IDU 14, typically at an appropriate service center.

The IDU 14 includes a logic control unit (also referred to herein as CPU) 22, a modem 24 (e.g., a cellular modem), a charge controller 26, and an energy storage unit 28 (also referred to herein as battery 28). Signals sent from control unit 18 are received by the modem 24 and processed by the CPU 22 into commands for the charge controller 26, the PV panel 16, and the battery 28. A charge interface 30 provides electrical energy to a device of an authenticated user, while an LCD display 32 can provide a charge status (of the user's device), a capacity of system 10, as well as system information such as charge state of battery, remaining activation time, cellular reception status, weather information, system notification, alerts, warnings, messages from the operator to the customer, AM/FM radio via a phone jack, and the like.

The PV panel 16 includes a built-in control mechanism (not shown) capable of controlling the power output from the panel according to secured, encrypted commands sent from the control unit 18 to the IDU 14. These commands can shut down the PV panel 16, turn it on continuously, or set a partial operation mode in which the PV panel 16 is turned on and off automatically for defined periods of time or based on defined electrical energy output limits. The PV panel 16 can be mounted on a motorized support and the pitch, yaw, or roll of the PV panel 16 can be controlled via the IDU 14 based on electrical energy generated by the PV panel 16, a predefined daily cycle, or commands from the control unit 18.

When the system 10 is idle (i.e. no energy plan has been purchased), the charge interface 30 can maintain a trickle current or be completely disconnected from the battery 28 (via a relay controllable by the CPU 22 or control unit 18). Likewise, when system 10 is illegally accessed, the charge interface 30 can be disconnected from the battery 28.

The CPU 22 is responsible for all the logic, user interface, and communication functions of the IDU 14, while the charge controller 26 is responsible for regulating electrical energy transfer from the PV panel 16 to the battery 28 according to preset battery 28 charging algorithms. In addition, the charge controller 26 is also responsible for protecting the battery 28 from overcharging, over discharging, and over-current provision from the PV panel 16.

The battery 28 includes a built-in authentication unit 29 which is responsible for battery pairing as described below. The authentication unit 29 can include a module for pairing the battery 28 with the PV panel 16. Such pairing can be control unit dependent or done logically by the control unit 18. The module can store a unique battery identifier (e.g., a serial number) which is matched with a PV panel identifier (e.g., a serial number) by the CPU 22 of the on-site installation or control unit 18. Such pairing can be effected at the time of system fabrication and optionally every time an energy plan is purchased by a user. Thus, each battery is matched (paired) to a specific PV panel 16. Any authorized change of a component, e.g. on-site replacement of a defective battery, is monitored by the CPU 22 and/or the control unit 18 and authorized to reestablish pairing.

The battery 28 can be operated via secured and encrypted commands provided from the control unit 18 through the IDU 14. These commands can activate the battery 28 to a required level (full operation, limited constant current output, limited time controlled current output, duty cycle, etc.), request telemetry information from the battery 28, and issue other commands and responses to support internal system synchronization and maintenance and optionally authenticate battery 28 for use with the IDU 14.

In addition to controlling the battery 28 and PV panel 16, the CPU 22 of the system 10 also provides security control over the charge controller 26. Commands from the control unit 18 can switch the charge controller 26 on or off according to user requirements, purchase plans, when the system 10 is tampered with, etc.

The system 10 enables several grades of service according to user requirements. The grades of service can be set according to the output of the PV panel 16, the capacity of the battery 28, and the charge controller 26.

In one exemplary and non-limiting embodiment, all commands issued by the control unit 18 are secured and encrypted to prevent unauthorized activation of the system 10 or any of its components. In yet another embodiment, one or more commands may be issued by the control unit 18 when unsecured. In addition, the PV panel 16 and battery 28 are physically protected (via a tamper-proof enclosure) to prevent unauthorized access to and bypassing of the components of system 10. Such physical protection mechanisms are employed without harming the system 10 components and while providing authorized access for repair.

The control unit 18 can collect information about the behavior, usage, and state of each component of one or more installations of the system 10. This information can be used to derive statistics pertaining to use, power output, tampering incidents, etc., and enables efficient monitoring and calibration of a network of the system 10 installations. Such information can also be used to derive usage profiles of specific users, regions, etc., and to fine tune services to match specific needs of users or regions. For example, the amount of electrical energy produced by the PV panel 16 can be monitored on a daily basis. If the amount of energy produced by a specific on-site installation is significantly lower than a neighboring installation (under similar weather conditions), the user or local operator of a specific system can be alerted of a problem and may be provided with instructions (e.g., via the LCD display or SMS) for verifying and solving the problem.

During manufacturing, each IDU 14 is tested and configured, and each PV panel 16, battery 28, and charge controller 26 receives a unique serial number and unique encryption key (preferably stored in authentication unit 29). These numbers are later transferred to the control unit 18 for control and authentication purposes. In one exemplary and non-limiting embodiment, only the unique serial number is shared.

The battery 28 is electrically connected to, and authenticated for use with, an environmental energy source 16 (also referred to herein as PV panel 16) and a control unit 18 for optionally further authenticating the battery-PV panel pairing and for controlling a quantity and/or rate of electrical energy which may be provided from the battery 28 and a quantity and/or rate of electrical energy transfer from the PV panel 16 to the battery 28. As is further described herein, such parameters can be controlled based on an energy plan purchased by the consumer, environmental factors (e.g. available sunlight, time of day), the storage capacity of the battery 28, the energy-producing capacity of the environmental energy source, or the types of devices connected to the system.

In order to enable pairing between the battery 28 and PV panel 16, the system 10 and, preferably, the battery 28, includes an authentication unit 29 for authenticating pairing.

The exemplary and non-limiting authentication unit 29 communicates with a CPU 22 and the charge controller 26 (e.g., over one or more dedicated wires or the terminal connections of the battery 28) of the on-site installation. The authentication unit 29 circuitry is physically protected against tampering and is sealed and concealed within the battery 28, for example, by protecting the authentication unit 29 with materials that seal it off from the environment, and the sealed unit can be placed within the battery 28 in a way which makes it difficult to reach or otherwise detect.

The authentication unit 29 enables operability of the battery 28 (i.e., storage of electrical energy provided from battery 28 and power output to a user device) only when it identifies a CPU 22 and charge controller 26 of a specific on-site installation and pairs therewith (such pairing is typically effected at system assembly or setup). Such pairing is typically effected once but can also be effected periodically, prior to every request for power provision, or following any modification or attempt to modify the system configuration.

Once the pairing is established, power can be stored in the battery 28 and withdrawn therefrom based on instructions sent from the control unit 18. For example, electrical energy withdrawal from the battery 28 is effected based on an instruction packet sent from the control unit 18 detailing an energy provision plan.

In addition to the above pairing procedure (which is established when the system 10 is set up), the control unit 18 can also monitor and further authenticate battery-PV panel pairing, as well as authenticate other system 10 components for use.

The control unit 18 can be wired to the battery 28 and to the PV panel 16 as a local configuration, or connected to the battery 28 and the PV panel 16 via a communication network 20 in a remote configuration. The remote configuration enables one control unit to control and monitor several on-site installations.

The components of an on-site installation portion of the system 10 are integrated into a shielded and secured housing (not shown) that is designed to withstand tampering and/or hacking. These components are further protected against over-voltage and/or over-current and/or reverse voltage and/or alternate current injection attempts that can render electronics inoperable.

The system 10 can further include mechanical and/or chemical barriers constructed in a way that will render the battery 28 or PV panel 16 inoperable in the event one attempts to physically access or remove these components. For example, the PV panel 16 elements may be bonded to a tempered glass such that mechanical attempts to access the circuitry that protect the PV panel 16, such as drilling, will result in glass and/or panel breakage. The battery 28 electronics can be hidden in such a way that, in order to bypass the protection, a hacker must damage the battery 28 cells and, thus, render the battery 28 inoperative.

In addition, the on-site installation of the system 10 can also trigger a silent alarm in case of component tampering and the GPS location of the components can be monitored to identify any unauthorized moving of the system or its components.

The on-site installation of the system provides authentication (pairing) of the battery 28 for use with the system 10 and, thus, does not allow use of an alternative (non-authorized) or auxiliary battery 28 with the system 10 or use of the battery 28 with any other system or device. It should be understood that the secure communication is typically established between a hub (not shown) and each component which allows the hub to identify what components exist in the system 10. The system 10 also maintains default power provisions from the battery 28 in order to power system components such as the charge controller 26 for regulating power output from the battery 28 or for authentication functions. The system also maintains default charging of the battery. The system 10 also provides authentication for use of authorized components (e.g., the charge controller 26, the battery 28, and the PV panel 16) with the system 10. Components not authenticated for use with the system 10 will not enable the battery 28 to deliver power and energy beyond all or portions of the default power and be charged. In one embodiment, charging may continue, fully or partially, even if the authentication fails or is not performed.

The control unit 18 provides authentication of a user and managing billing. The control unit 18 controls electrical energy and power provided to the user device based on a pre-purchased plan and the charge state (charging/discharging) of the battery. The control unit 18 optionally authenticates on-site components for use with the system 10.

One of ordinary skill in the art would readily realize that there are two types of authentications described herein. A first authentication is performed to program the pairing in the control unit 18 for enabling the autonomous operation for as long as the purchase plan is in full force and effect. The second authentication mechanism is local to check for proper pairing so that unauthorized components and/or elements are not connected or disconnected from the system 10.

Authentication (pairing) of the battery 28 for use with the system 10 is particularly important since it overcomes limitations of prior art systems that allow for a non-authorized user to steal power from the system (see, for example, prior art systems such as those described in U.S. Pat. No. 6,191,501 or PCT Application No. PCT/IL13/50587, each of which includes a control unit that is integrated into the system). The environmental energy source (e.g., solar panel) of such prior art systems cannot be used without this control unit nor can the solar panel be connected directly to a battery. This renders the solar panel useless in the hands of thieves.

As such, these prior art systems only address theft of the solar panel, but do not address theft of electricity. Simply put, in such systems, a user can connect a secondary battery to the system (or to the primary battery), or connect another battery directly to the control unit to steal electricity. In addition, such systems do not address theft of the battery itself, since stolen batteries can be used without restrictions in other systems and for other purposes.

Authentication (pairing) of the battery 28 for use with the system 10 described above serves to address this particular problem and provide an extra measure of security against theft of electricity by providing security measures which either restrict discharge of the battery 28 only when connected to, and authenticated with, the system 10 and/or rendering a battery 28 useless (incapable of charge and/or discharge) when disconnected from the system 10.

Thus, theft of electricity or the battery 28 from the system 10 is prevented by the authentication unit 29 which forms a part of the battery 28 and enables pairing between the battery 28 and PV panel 16 or other system 10 components such as the charge controller 26. In one exemplary and non-limiting embodiment, if there is an attempt to replace the battery 28 with a non-authorized battery (which does not include the authentication unit 29), no pairing will take place and the replacement battery will not charge, or otherwise may have limited charging ability. Likewise, attempting to connect a second battery in parallel with the authenticated battery 28 will result in no charging of the second battery.

In addition, a stolen battery 28 will not be operable in other systems and since a battery 28 disconnected from the system 10 will not supply any substantial current other than a small bleeding current, the stolen battery 28 is not useful for most other applications.

Such attempts at stealing components or electrical energy can also trigger a complete system shutdown by the control unit 18.

Alternatively, authentication (pairing) between the battery 28 and the PV panel 16 or other components of the system 10 can be handled by the control unit 18 over the communication network 20, wherein authentication is performed by the control unit 18, which verifies and controls use of a specific battery 28 via secure control signals.

If such an authentication by the control unit 18 detects removal of a component of the system 10 (e.g., the battery 28, the PV panel 16, or the charge controller 26) or replacement thereof with an unauthorized component, an authentication server (not shown) of the control unit 18 issues a denial of service signal through the communication network 20 and effectively shuts down the system 10 (while maintaining default power provision to authenticated components).

For example, if a user removes the battery 28 from the on-site installation and tries to replace it with an unauthorized battery, the authentication server of the control unit 18 can issue a warning to an operator or automatically disable charging, preventing charging of the unauthenticated battery from the energy source and preventing drawing of current from the unauthenticated battery through the system. Hence, the method would include detecting that a new battery is connected to the system 10, sending a message to the control unit 18, and, upon determining that an unauthorized battery has been connected to the system 10, issuing a warning message to an operator 52. The operator may then perform a method where one or more commands are sent to the system 10 to cause it to disable charging of the unauthorized battery.

Figure 2:
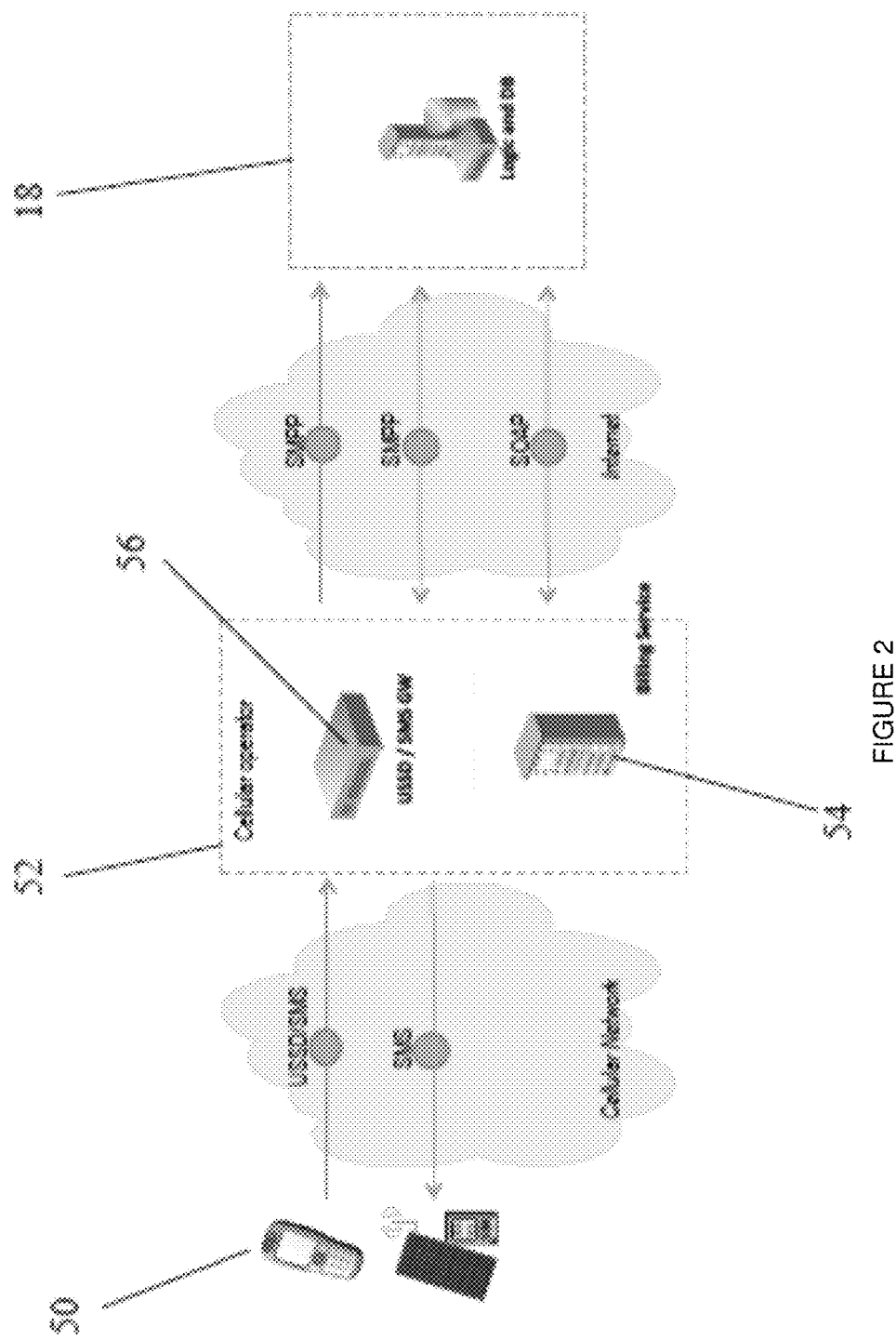
FIG. 2 is a diagram illustrating a flow of purchasing of electrical energy from the present system.

FIG. 2 illustrates an exemplary and non-limiting package/plan-purchase scenario for the system 10. A user purchases a use package/plan using, for example and without limitation, Short Message Service (SMS), Unstructured Supplementary Service Data (USSD) of a mobile phone 50, or another web service mechanism. A communication provider 52 sends a notification to control unit 18 regarding a user request and payment. The user can also purchase a package/plan using a secured web service or by contacting a local sale point. In those cases, the web service or the sales agent interface sends a notification to the control unit 18 regarding user requests and payment. The control unit 18 of system 10 communicates with billing service 54 to establish user credit and collect payment. The control unit 18 then switches on a specific on-site installation (requested by the user or being in the vicinity thereof) by sending a switch on command to the CPU 22 thereof.

The user then draws electrical energy from interface 30 (power outlet) of system 10 for the time/electrical energy limit allotted by the package/plan purchased thereby.

In an exemplary and non-limiting scenario, system 10 can provides electrical energy to power appliances, lights, etc. of a specific home, in which case, system 10 can be installed in the home or be installed remotely from the home and wired thereto. In the latter case, a single system 10 can provide electrical energy to several connected homes. The system 10 can also be installed in a central location (e.g., a mall or airport) to provide electrical energy to devices such as laptops, phones, and so on of travelers, shoppers, and the like.

In any case, if a specific installation of the system 10 is tampered with, any purchase plans associated with this system 10 are canceled.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination. Further, as used herein the term "about" refers to ±10%.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for providing electrical energy to an energy consumer, comprising:
   an environmental energy source installed at a fixed location for generating electrical energy;
   an energy storage unit installed at a fixed location that is electrically coupled to the environmental energy source to store the electrical energy generated by the environmental energy source; and
   a control unit permanently electrically coupled to the environmental energy source and to the energy storage unit, the control unit further comprising an authentication unit configured to periodically authenticate operation of the energy storage unit with the environmental energy source such that, upon authentication by the authentication unit, the control unit controls the flow of electrical energy generated by the environmental energy source to allow electrical energy to flow from the environmental energy source to the energy storage unit;
   wherein the environmental energy source, the energy storage unit, and the control unit are all independent from any grid in that they are not connected to any grid;
   wherein the control unit is configured to control at least one of:
      a quantity of electrical energy that is provided from the energy storage unit;
      a rate of electrical energy that is provided from the energy storage unit;
      a quantity of electrical energy that is transferred from the environmental energy source to the energy storage unit;
      a time period during which energy may be transferred from the environmental energy source to the energy storage unit;
      a rate of electrical energy transfer from the environmental energy source to the energy storage unit;
   wherein the control unit is further configured to perform the control based on a purchased energy plan; and
   wherein the purchased energy plan is purchased over a cellular network, wherein further authentication information respective of the purchased energy plan is provided to the system over the cellular network for authentication by the authentication unit.

2. The system of claim 1, wherein the authentication unit is further configured to perform at least one of:
   enable supply of energy from the environmental energy source to the energy storage unit upon a positive authentication result between the environmental energy source and the energy storage unit;
   enable supply of energy from the energy storage unit to the energy consumer upon a positive authentication result between the energy storage unit and the energy consumer;
   disable supply of energy from the environmental energy source to the energy storage unit upon a negative authentication result between the environmental energy source and the energy storage unit; and
   disable supply of energy from the energy storage unit to the energy consumer upon a negative authentication result between the energy storage unit and the energy consumer.

3. The system of claim 1, wherein the authentication unit is integrated within the energy storage unit.

4. The system of claim 3, wherein the authentication unit ceases authentication upon mechanical damaging of the energy storage unit.

5. The system of claim 1, wherein the control unit is further configured to perform the control based on authentication of the energy consumer.

6. The system of claim 1, further comprising a network, wherein the control unit is remote to the environmental energy source and to the energy storage unit.

7. The system of claim 1, wherein the environmental energy source provides electrical energy from at least one of: wind, sun, water currents, and waves.

8. The system of claim 1, wherein the environmental energy source further comprises at least a photovoltaic cell.

9. A method for use in a system for providing electrical energy to an energy consumer, the system, comprising
an environmental energy source installed at a fixed location for generating electrical energy;
an energy storage unit installed at a fixed location that is electrically coupled to the environmental energy source to store the electrical energy generated by the environmental energy source; and
a control unit permanently electrically coupled to the environmental energy source and to the energy storage unit, the control unit further comprising an authentication unit;
wherein the environmental energy source, the energy storage unit, and the control unit are all independent from any grid in that they are not connected to any grid, the method comprising:
performing, by the authentication unit, an authentication of the electrical connection between the energy storage unit and the environmental energy source such that, upon authentication by the authentication unit, the control unit controls the flow of electrical energy generated by the environmental energy source to allow electrical energy to flow from the environmental energy source to the energy storage unit;
wherein the control unit is configured to control at least one of:
a quantity of electrical energy that is provided from the energy storage unit;
a rate of electrical energy that is provided from the energy storage unit;
a quantity of electrical energy that is transferred from the environmental energy source to the energy storage unit;
a time period during which energy may be transferred from the environmental energy source to the energy storage unit;
a rate of electrical energy transfer from the environmental energy source to the energy storage unit;
wherein the control unit is further configured to perform the control based on a purchased energy plan; and
wherein the purchased energy plan is purchased over a cellular network, wherein further authentication information respective of the purchased energy plan is provided to the system over the cellular network for authentication by the authentication unit.

10. The method of claim 9, wherein the authentication is performed periodically.

11. The method of claim 9, wherein performing an authentication ceases upon determination of mechanical damage to the energy storage unit.

12. The method of claim 9, further comprising at least one of:
enabling supply of energy from the environmental energy source to the energy storage unit upon a positive authentication result between the environmental energy source and the energy storage unit;
enabling supply of energy from the energy storage unit to the energy consumer upon a positive authentication result between the energy storage unit and the energy consumer;
disabling supply of energy from the environmental energy source to the energy storage unit upon a negative authentication result between the environmental energy source and the energy storage unit; and
disabling supply of energy from the energy storage unit to the energy consumer upon a negative authentication result between the energy storage unit and the energy consumer.

13. The method of claim 9, further comprising:
authenticating the energy consumer by the authentication unit.

14. The method of claim 9, wherein the environmental energy source provides electrical energy from at least one of: wind, sun, water currents, and waves.

15. The method of claim 9, wherein the environmental energy source comprises at least a photovoltaic cell.

* * * * *